(12) United States Patent
Viaud

(10) Patent No.: US 6,398,654 B1
(45) Date of Patent: Jun. 4, 2002

(54) OVERLOAD CLUTCH

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 28 days.

(21) Appl. No.: 09/713,077

(22) Filed: Nov. 15, 2000

(30) Foreign Application Priority Data

Nov. 16, 1999 (DE) .......................... 199 54 938

(51) Int. Cl.$^7$ ................................ F16D 9/06
(52) U.S. Cl. ............................ 464/33; 464/30
(58) Field of Search ................ 464/30, 32, 33, 464/10, 161, 169, 37, 38, 39

(56) References Cited

U.S. PATENT DOCUMENTS

| | | | |
|---|---|---|---|
| 1,672,582 A | | 6/1928 | Tenney |
| 3,103,004 A | * | 9/1963 | Murray ................ 464/33 |
| 3,246,483 A | | 4/1966 | Schmitter |
| 3,435,695 A | * | 4/1969 | Rivers ................ 464/33 |
| 4,174,621 A | * | 11/1979 | Woltjen ............... 464/30 |
| 4,185,477 A | | 1/1980 | van der Lely et al. |
| 4,186,570 A | | 2/1980 | Pokrandt |
| 4,220,019 A | | 9/1980 | Mast et al. |
| 4,315,418 A | * | 2/1982 | van der Lely et al. ... 464/33 |
| 4,799,833 A | * | 1/1989 | Pennison et al. ...... 408/132 |
| 4,944,379 A | | 7/1990 | Haaser |

FOREIGN PATENT DOCUMENTS

| | | |
|---|---|---|
| DE | GM19 97 957 | 12/1968 |
| DE | 90 008 | 4/1971 |
| DE | 88 866 | 3/1972 |
| DE | GM75 28 634 | 10/1976 |
| DE | 1 29 364 | 1/1978 |
| DE | 77 12 518 | 10/1978 |
| DE | 29 31 732 | 2/1981 |
| DE | 37 17 692 | 12/1987 |
| GB | 1 376 398 | 12/1974 |
| GB | 15 04 941 | 3/1978 |

* cited by examiner

Primary Examiner—Lynne H. Browne
Assistant Examiner—Kenn Thompson

(57) ABSTRACT

A drive shaft and driven chain sprocket are interconnected by an overload clutch embodying a shear pin. The overload clutch includes a first clutch element fixed for rotation with the shaft, a second clutch element mounted on the shaft next to the first clutch element for axial and rotational movement relative to the first clutch element. The second clutch element includes a circular flange disposed against a flat circular surface of the sprocket and coupled for rotation therewith by a shear pin extending through aligned holes in the flange and sprocket. The sprocket is mounted for rotation about a cylindrical shoulder provided on one side of the circular flange of the second clutch element. The first and second clutch elements respectively have positive engaging surface elements that are normally held in locking engagement with each other by a coil compression spring acting between the shaft and the sprocket. After load condition causes the a shear pin to shear, a realignment of holes in the second clutch element flange and the sprocket is achieved by overcoming the force holding the first and second clutch elements in engagement with each other and then rotating the second clutch element relative to the first clutch element and the sprocket.

9 Claims, 1 Drawing Sheet

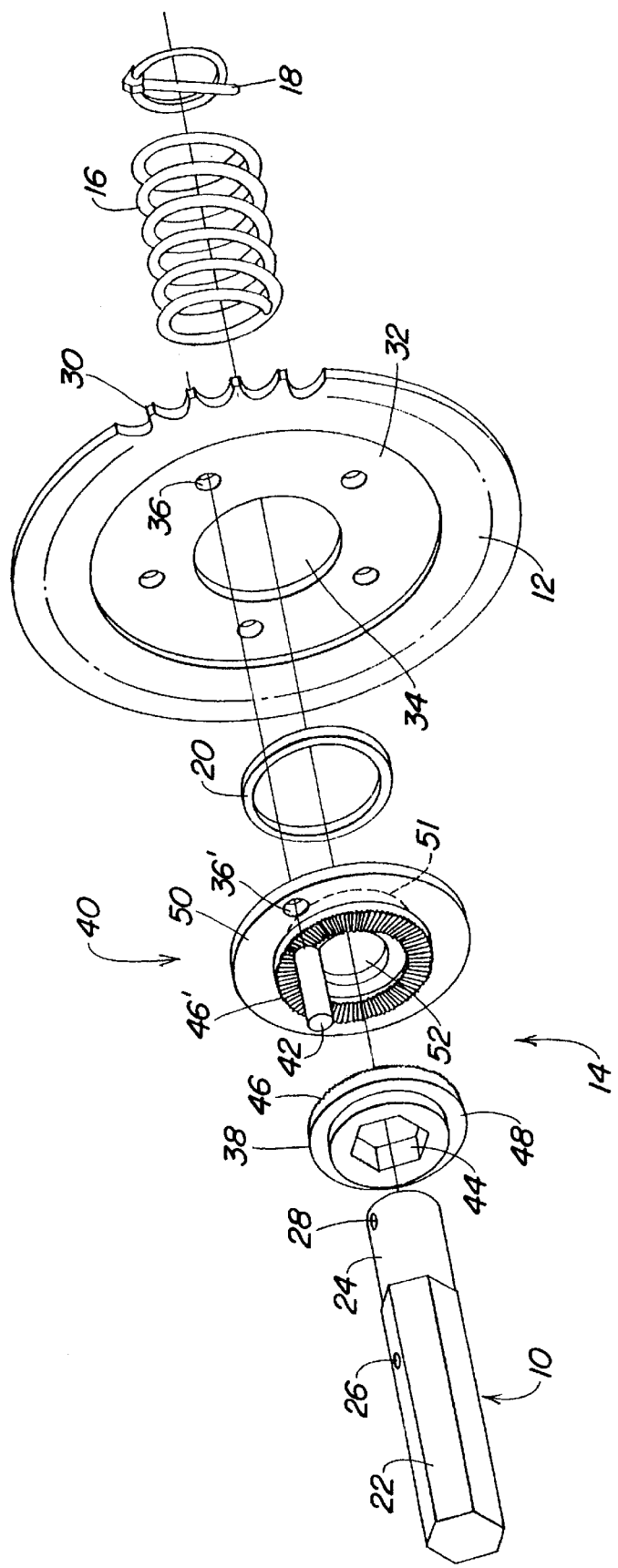

OVERLOAD CLUTCH

The present invention pertains to an overload clutch between first and second rotating parts, with said clutch including a shear element.

BACKGROUND OF THE INVENTION

U.S. Pat. No. 4,220,019, granted to Mast et al. on Sep. 2, 1980, discloses an overload clutch with a shear pin that extends through opening s in a flange of a shaft and a chain drive sprocket. A catch that can engage with a groove on the circumferential surface of the flange, when the direction of rotation is reversed, is also provided on the sprocket. Due to this measure, it is possible to reverse the drive in order to repair the jamming caused by the shearing of the shear pin.

The problem which the invention aims to solve can be seen in the fact that the flange and sprocket need to be brought into a position where the openings are aligned with one another after shearing of the shear pin so that a new shear pin can be inserted. Since the shaft, as well as the sprocket, are frequently subjected to a load, it is initially required to repair the jammed drive train or to separate a drive connection in order to align the openings.

SUMMARY OF THE INVENTION

According to the present invention, there is provided an improved overload clutch of the type including separate rotatable members that are normally interconnected with a shear pin.

A broad object of the invention is to provide a drive connection between two rotating parts which includes a clutch element that is coupled to one of the rotating parts by a shear element where, subsequent to a shear taking place, the clutch element associated with the shear pin can be brought, without being subjected to a load, into a position where a new shear element can be inserted.

A more specific object of the invention is to provide an overload clutch of the type noted above, wherein the two drive parts are interconnected to each other by an overload clutch including a first clutch element fixed to one drive part and a second clutch element fixed to the other drive part by a shear element, with the second clutch element normally being engaged for rotation with the first clutch element but, subsequent to a shear occurring, being easily selectively rotatable relative to the associated drive part to permit the second clutch element and associated drive part to be realigned for allowing the insertion of a new shear element.

These and other objects will become apparent from a reading of the ensuing description together with the appended drawing.

BRIEF DESCRIPTION OF THE DRAWINGS

The sole FIGURE is an exploded view showing a drive assembly embodying an overload clutch constructed in accordance with the present invention.

DESCRIPTION OF THE PREFERRED EMBODIMENT

Referring now to the drawing, there is shown a drive assembly including a first drive part in the form of a shaft 10, a second drive part in the form of a chain drive sprocket 12, an overload clutch 14, a spring 16, a cotter pin 18 and a sliding ring 20.

In the disclosed embodiment, the shaft 10 includes a hexagonal section 22 and a round section 24 that are arranged in axially successive fashion. Diametrically extending holes 26 and 28 are respectively provided in the sections 22 and 24. The shaft 10 may form either the driving part or the driven part of a drive train.

The sprocket 12 includes an outer curcumferential surface provided with a series of teeth 30. These teeth are able to engage with a roller chain. However, in lieu of the sprocket 12, a toothed gear or a pulley, a flange for connection to an additional shaft, or the like may be used. Like the shaft 10, the sprocket 12 may be either the driven or the drive part of a drive train. By comparison to the shaft 10, the sprocket 12 has a significantly larger diameter and contains a central circular surface 32 with a central circular opening 34. The area of the circular surface 32 is slightly recessed, in comparison to the remaining area of the sprocket 12, and contains five uniformly spaced openings 36 on a circle that lies centrally between the inner edge and outer edge of the circular surface 32. In other respects, the sprocket 12 is realized in the form of an essentially flat, cylindrical disk.

The shaft 10 and sprocket 12 are inserted into a drive train of a harvesting machine, a crop collecting machine or another agricultural machine and transmit the driving power to a material processing device or the like. A few examples are the drives of a press piston of a baling press, a chopper, a crop receiving device, a grain tank unloader, etc.

The overload clutch 14 is composed of first and second clutch elements 38 and 40, respectively, as well as a shear element in the form of a pin 42, which could also be a conventional shear screw or the like. The clutch 14 serves to interconnect the shaft 10 and sprocket 12 such that they rotate together, under normal operating circumstances, as well as to interrupt the drive if an overload condition occurs.

The first clutch element 38 is in the form of a hub that contains a concentric hexagonal hole 44, radially running positive engagement elements 46, and a sleeve region 48. The hexagonal hole 44 is shaped complementary to and received on the hexagonal section 22 of the shaft 10 so that there is no play between the clutch element 38 and the shaft 10, and so that the shaft 10 and clutch part 48 rotate together.

All positive engagement elements 46 are arranged in a common plane that extends radially with reference to the central axis of the shaft 10, and are formed as radial, and consequently wedge-shaped teeth. In the embodiment shown, a series of very fine teeth is provided.

The sleeve region 48 of the clutch element 38 extends axially over approximately half the length of, and has an outside smaller outside diameter than the remainder of, the element 38. A hole, not shown, extends diametrically through the sleeve region 48 and, in the assembled state, is aligned with the hole 26 in the shaft, with dowel pin, a screw or the like being inserted into the aligned holes such that the first clutch element 38 is secured to the shaft 10.

The second clutch element 40 is composed of a flange 50 and positive engagement elements 46', which are arranged coaxially to one another and are connected to one another such that they rotate together. The flange 50 is dimensioned such that it can be accommodated within the recessed area defined by the circular surface 32. The flange 50 is provided with an opening 36', whose radial distance from the central axis of the shaft 10 corresponds to that of the openings 36 of the sprocket 12. The openings 36 and 36' can be aligned relative to one another and serve to accommodate the shear element 42. On the side of the flange 50 that faces the sprocket 12, a hub 51 is arranged which extends through the circular opening 34 and rotatably accommodates the sprocket 12 by means of the sliding ring 20.

The positive engagement elements 46' on the second clutch element 40 are made identical to the positive engagement elements 46 on the first clutch element 38, and are arranged in a mirror image form relative to these elements. The positive engagement elements 46' are arranged on or embedded into the flange 50 in the manner of a hub. The positive engagement elements 46 and 46' may be provided with flanks that extend only in the axial direction, and consequently form a limit stop in each direction of rotation. However, they may also have a shape similar to a sawtooth, i.e., with an axial flank and an ascending flank. In this case, the ascending flank cannot extend in the direction of rotation during normal operation of the clutch because the connection would act like a slip clutch, wherein the spring 16 would have to ensure the rotationally rigid connection. Instead of an axial flank progression, it would also be conceivable to provide the flanks with a negative progression, i.e., with an acute angle.

In any event, the finer the teeth 46 and 46' the more accurately can alignment of the openings be achieved, with a possibly existing offset between the rotating parts also being reduced proportionally to the fineness of the teeth.

A hole 52 extends axially and centrally through the second clutch element 40, with the diameter being chosen such that the second clutch element 40 can be rotatably accommodated on the round section 24 of the shaft 10 with the least play possible. This means that the sprocket 12 is arranged concentrically with the shaft 10 by means of the second clutch element 40. The spring 16 is a helical compression spring and is arranged between the side of the sprocket 12, situated opposite to the overload clutch 14, and the cotter 18 that is received in the hole 28 provided in the shaft 10.

The purpose of the spring 16 is to hold the clutch elements 38 and 40 together until it is necessary to rotate the second clutch element 40 relative to the element 38 in order to align the hole in the flange 50 with those in the sprocket 12 in order to insert a new shear pin. In lieu of the spring 16, it is possible to releasably secure the clutch elements 38 and 40 for axial movement relative to each other by employing cotter pins, limit stops, screws, etc. which, if so required, must be removed in order to permit such axial movement.

The assembly and operation of an overload clutch thus designed is described below.

The first clutch element 38 is placed onto, and secured to, the shaft 10 by a dowel pin that extends through the hole (not shown) provided in the element 38 and the hole 26 in the shaft hexagonal section 22. Subsequently, the second clutch element 40 is placed onto the shaft round section 24 and turned such that the positive engagement elements 46 and 46', respectively of the clutch elements 38 and 40, engage with one another. The sprocket 12 is placed onto the hub, not show, on the opposite side of the clutch element 40 from the positive engagement elements 46', and the shear element 42 is inserted into the opening 36' and an aligned one of the openings 36, i.e., the shear element is positively engaged or force-fit in these openings. Subsequently, the spring 16 is installed with a certain pre-load, the spring pressing the sprocket 12 onto the second clutch element 40 in the mounted condition and pressing the second clutch element 40 onto the first clutch element 38.

Once the assembly is completed, it is possible to transmit a torque between the shaft 10 and the sprocket 12. If an overload condition occurs, the shear element 42 shears off and the connection between the second clutch element 40 and the sprocket 12 is lost. Because of the overload condition that caused the shearing, one of the parts 10 or 12 can be moved only with great difficulty, if at all, while the other of the parts continues to rotate. This results in the openings 36 and 36' moving from alignment with each other, such that a new shear pin cannot be installed. In order to achieve this alignment, the second clutch element 40 is turned relative to the first clutch element 38 on the ascending flanks of the positive engagement elements 46 and 46' until the openings 36 and 36' are once again aligned with one another. If the force of the spring 16 is excessively high, it is also possible to remove the cotter pin 18 and loosen the spring 16 so that the clutch element 40 can be turned into a position where the openings 36 and 36' are aligned with one another.

In an embodiment not shown, the positive engagement elements 46 and 46' are not arranged on radially extending surfaces, but rather on the outer circumferential surface of the first and second clutch elements 38 and 40, namely similar to a chain sprocket or the like. In this case, the positive engagement elements would be connected to one another such that they rotate together by means of a displaceable socket or the like that is provided with internal teeth. Instead of using a socket, it would also be conceivable to provide a double chain. In addition, the positive engagement elements could also be provided on the inner circumference of a hole instead of on the outer circumference, and be connected to one another by means of a sleeve with exterior teeth.

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

What is claimed is:

1. In an overload clutch including first and second rotating parts, normally coupled for rotation together about an axis, and a shear element which shears during an overload so as to disengage said first rotating part from said second rotating part, the improvement comprising: said clutch including first and second clutch elements mounted in side-by-side relationship to each other for rotation about said axis; said first and second clutch elements including respective surfaces that can be positively engaged with one another, in different angular positions of said clutch elements so that said clutch elements normally rotate together; a holding arrangement associated with said clutch elements for releasably maintaining said clutch elements in positive engagement with each other; said first clutch element being connected to said first rotating part; and a shear element connecting said second clutch element to the second rotating part for rotation together.

2. The overload clutch as defined in claim 1 wherein said respective surfaces of said first and second clutch elements are in the form of complementary shaped teeth on respective end faces, of said first and second clutch elements, which are in axial engagement with each other.

3. The overload clutch as defined in claim 2 wherein one of said first and second rotating parts is mounted for axial movement relative to the other of said first and second rotating parts.

4. An overload clutch as defined in claim 3 wherein said second rotating part is mounted for axial movement relative to said first rotating part; and said holding arrangement including a spring mounted so as to bias said second clutch element into positive engagement with said first clutch element.

5. The overload clutch as defined in claim 1 wherein said second clutch element has a flange provided with a first hole which is aligned with a second hole in said second rotating part; and said shear element being in the form of a shear pin received in said first and second holes.

6. The overload clutch as defined in claim 1 wherein said first part is in the form of a shaft; said first clutch element being received on and fixed to said shaft so as to rotate in unison with said shaft; said second clutch element being received on said shaft for free rotation about and axial movement along said shaft; said second rotating part being disposed in concentric relationship to said shaft; and a coil compression spring disposed concentrically about said shaft and being loaded between a stop carried by the shaft and said second clutch element.

7. The overload clutch as defined in claim 6 wherein said second rotating part is in the form of a chain sprocket defined by a circular plate having teeth on its outer periphery and having a at least one hole located at a preselected radius from a central axis coincident with said shaft; said second clutch element including a circular flange having radius greater than said preselected radius and having a second hole aligned with said at least one hole in said circular plate; and said shear element being in the form of a pin received in said second and at least one holes.

8. The overload clutch as defined in claim 7 wherein said sprocket includes a central mounting hole of a given diameter larger than said shaft; said second clutch element including a cylindrical shoulder, having a diameter that is somewhat less than said given diameter, joined to said circular flange and located in said central mounting hole so as to define a ring-like space; and a slip ring being received in on said shoulder and having an outer diameter substantially equal to said given diameter so that it fills said ring-like space.

9. The overload clutch as defined in claim 5 wherein said second hole forms part of a series of equi-angularly spaced holes located in a circular arrangement about said axis; and said respective surfaces of said first and second clutch elements being shaped so as to define a plurality of positive engagement positions spaced small angular distances from each other about said axis, whereby after a shear has taken place, the positive holding arrangement may be released so as permit the first clutch element to be moved relative to the second clutch element so as to bring the hole in said flange of said second clutch element into alignment with one of said series of holes so as to permit installation of a new shear pin.

* * * * *